United States Patent
Pellini et al.

(10) Patent No.: US 11,236,543 B2
(45) Date of Patent: Feb. 1, 2022

(54) DOUBLE-GLAZING SYSTEMS WITH RETROREFLECTIVITY PROPERTIES

(71) Applicant: Pellini S.p.A., Codogno (IT)

(72) Inventors: Alessandro Pellini, Codogno (IT); Luca Papaiz, Codogno (IT)

(73) Assignee: PELLINI S.P.A., Codogno (IT)

( * ) Notice: Subject to any disclaimer, the term of this patent is extended or adjusted under 35 U.S.C. 154(b) by 852 days.

(21) Appl. No.: 16/071,522

(22) PCT Filed: Jan. 25, 2017

(86) PCT No.: PCT/IB2017/050383
§ 371 (c)(1),
(2) Date: Jul. 20, 2018

(87) PCT Pub. No.: WO2017/130110
PCT Pub. Date: Aug. 3, 2017

(65) Prior Publication Data
US 2021/0087871 A1    Mar. 25, 2021

(30) Foreign Application Priority Data

Jan. 26, 2016   (IT) .................... 102016000007736

(51) Int. Cl.
*E06B 3/66* (2006.01)
*E06B 3/67* (2006.01)
(Continued)

(52) U.S. Cl.
CPC .......... *E06B 3/6612* (2013.01); *E06B 3/6715* (2013.01); *E06B 9/24* (2013.01);
(Continued)

(58) Field of Classification Search
CPC ........ E06B 3/66; E06B 3/6612; E06B 3/6715; E06B 9/264; E06B 9/24; E06B 9/26;
(Continued)

(56) References Cited

U.S. PATENT DOCUMENTS 2,155,985 A * 4/1939 Waterman ............... E06B 9/305
                                                    160/176.1 R
6,103,345 A * 8/2000 Oshima .................... B32B 3/00
                                                    428/172
(Continued)

FOREIGN PATENT DOCUMENTS

WO   2014191234 A1   12/2014

OTHER PUBLICATIONS

International Search Report and Written Opinion dated May 18, 2017, in PCT Application No. PCT/IB2017/050383, 10 pages.

*Primary Examiner* — Donald J Loney
(74) *Attorney, Agent, or Firm* — MH2 Technology Law Group, LLP

(57) ABSTRACT

An insulating glazing system may include: at least two glass panes and a spacer element, wherein the at least two glass panes and the spacer element define a closed volume; a light ray shielding device within the closed volume, defining: transparent areas allowing passage of incident light rays with a given angle of incidence, whereas light rays having other angles of incidence are unable to pass through the transparent areas; and non-transparent areas configured to block the passage of the incident light rays, the non-transparent areas defining first and second surfaces; and a support means connected to the spacer element and operably associated with the shielding device. The shielding device may include a layer having retroreflective properties. The layer may at least partially cover one or both of the first and second surfaces of at least one of the areas of the non-transparent areas of the shielding device.

10 Claims, 3 Drawing Sheets

(51) Int. Cl.
  *E06B 9/24* (2006.01)
  *E06B 9/26* (2006.01)
(52) U.S. Cl.
  CPC ......... *E06B 9/26* (2013.01); *E06B 2009/2405* (2013.01); *Y02A 30/249* (2018.01); *Y02B 80/22* (2013.01)
(58) Field of Classification Search
  CPC ..... E06B 2009/2405; E06B 2009/2417; E06B 2009/2643; Y02A 30/249; Y02B 80/22
  See application file for complete search history.

(56) References Cited

U.S. PATENT DOCUMENTS

2002/0038694 A1    4/2002  Levert
2015/0345206 A1*  12/2015  Vikor ..................... C03C 17/36
                                                       428/34

\* cited by examiner

DOUBLE-GLAZING SYSTEMS WITH RETROREFLECTIVITY PROPERTIES

CROSS-REFERENCE TO RELATED APPLICATION(S)

This application is a national stage entry from International Application No. PCT/IB2017/050383, filed on Jan. 25, 2017, in the Receiving Office ("RO/IB") of the International Bureau of the World Intellectual Property Organization ("WIPO"), and published as International Publication No. WO 2017/130110 A1 on Aug. 3, 2017; International Application No. PCT/IB2017/050383 claims priority from Italian Patent Application No. 102016000007736, filed on Jan. 26, 2016, in the Italian Patent and Trademark Office ("IPTO"), the entire contents of all of which are incorporated herein by reference.

FIELD OF THE INVENTION

The present disclosure relates to an insulated glazing system with retroreflective properties, particularly an insulated glazing system having a light ray shielding device therein, as defined in the preamble of claim 1.

DISCUSSION OF THE RELATED ART

The provision of insulated glazing units, also known as double glazing units, with integrated Venetian blinds is known in the art.

Insulated glazing units, which are usually employed as windows to separate an outdoor environment from an indoor environment, comprise two parallel glass panes and a spacer element. The space between the two glass panes is sealed in an airtight manner, and may contain air or various types of gases, such as argon and krypton, according to the desired properties.

As compared with normal windows, insulated glazing units improve heat and sound insulation and may have a greater mechanical strength and afford higher safety.

Light ray shielding devices may be provided in an insulated glazing unit, such as Venetian blinds, which are usually composed of a plurality of light-blocking slats.

Their placement in the insulated glazing unit (i.e. within the volume defined by the two glass panes) both prevents damages thereto, and provides a compact and, in the first instance, maintenance-free arrangement.

Insulated glazing units are known to be affected by the problem of overheating in the volume defined by the insulated glazing unit.

This problem is particularly felt under hot weather conditions. The problem occurs because while incident radiation, e.g. solar radiation, is blocked from directly reaching the indoor environment, due to the provision of the light ray shielding devices, it is still absorbed by the light ray shielding devices which transfer part of this absorbed heat, by contact, to the gases in the insulated glazing unit.

Therefore, the temperature in the sealed volume of the insulated glazing unit may considerably increase (and possibly even exceed 70° C.), because the heat accumulated in the insulated glazing unit is hardly dissipated due to the heat insulating properties of the unit.

The increased temperature in the insulated glazing unit may lead to damages to the electric and electronic components for controlling the Venetian blind.

Temperature increase may also cause an increase in the gas volume, leading to a deflection (or warpage) of the glass panes. Such deflection stresses the spacer and leads to early aging thereof, with obvious and imaginable consequences in terms of hermetic sealing.

Another possible arrangement for blocking the passage of light and heat into the indoor environment consists in the application of a layer of reflective material on the outside pane.

Nevertheless, large buildings with many reflective windows are not well integrated in the surrounding environment, as reflected light reverberates downwards and heats adjacent objects, such as cars and building, and dazzles external observers.

US 2002/038694 discloses an insulated glazing unit having a Venetian blind with a reflective layer applied thereto.

WO 2014/191234 discloses an electrophoretic device to be mounted to glass structures for controlling the heating effect of solar radiation. Particularly, this document discloses microspheres encapsulated in an electrophoretic cell. Such microspheres have a passive role with respect to incident light rays and act as simple spacers for ink within the electrophoretic cell.

SUMMARY OF THE INVENTION

The invention has the object to provide an insulated glazing system that attenuates the above discussed problems.

According to the present invention, the insulated glazing system has retroreflective properties, as defined in claim 1.

Advantages of the Invention

With the present invention, the radiation incident on the light ray shielding device is mainly reflected toward the direction from which it is emitted. This will considerably reduce the amount of radiation that can get through the system, thereby preventing the indoor environment from being heated.

Therefore, the present invention will provide an insulated glazing system that is not exposed to overheating and does not dazzle observers in the indoor environment.

A light ray shielding device may be advantageously installed in an insulated glazing unit, with the outwardly-reflected radiation being mainly directed upwards, and being not incident on passers-by or nearby buildings, thereby attenuating the urban heat island effect created by reflective glazings.

BRIEF DESCRIPTION OF THE DRAWINGS

The characteristics and advantages of the present disclosure will appear from the following detailed description of a possible practical embodiment, illustrated as a non-limiting example in the set of drawings, in which.

DETAILED DESCRIPTION

Figure 1:
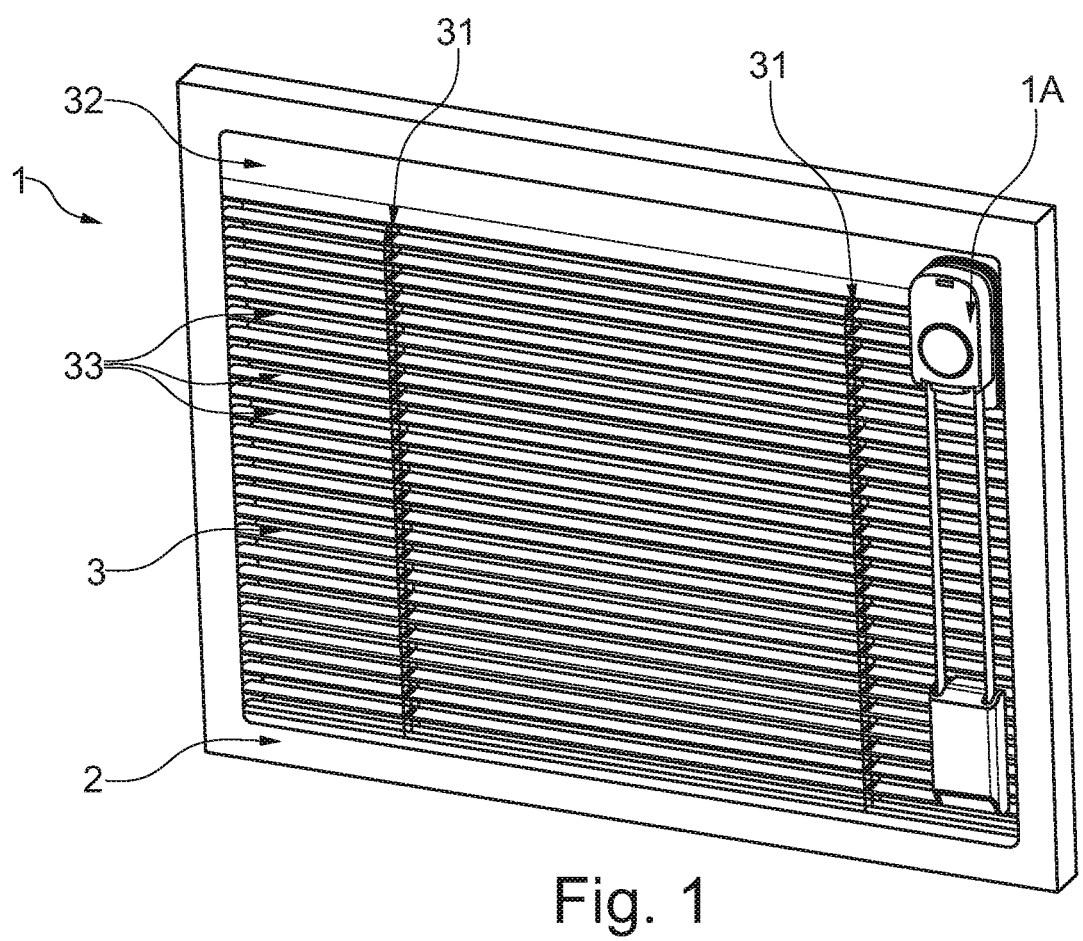
FIG. 1 shows an insulated glazing system having a light ray shielding device such as a Venetian blind.

The present disclosure relates to an insulated glazing system and a light ray shielding device situated within the insulated glazing unit.

This system, composed of an insulated glazing unit and the light ray shielding device may be employed as a window for separating an indoor environment from an outdoor environment, by means of the light ray shielding device that blocks the radiation that passes through the window.

For simplicity, the term "insulated glazing unit" will be used herein to designate a hermetically sealed double glazed structure.

As used herein, the term "light ray shielding device" is intended to designate a device having:

a plurality of transparent areas allowing the passage of incident light rays with a given angle of incidence, whereas light rays having other angles of incidence are unable to pass through said transparent area; and a plurality of non-transparent areas, which are configured to block the passage of light rays.

Such plurality of transparent areas may be arranged in side-by-side relationship, and the non-transparent areas may be also arranged in side-by-side relationship.

Preferably, the transparent areas are arranged, relative to non-transparent areas, according to geometric patterns, as is known to the skilled person, such as checkered, grid, longitudinally or vertically striped patterns.

As used herein, the term light rays is intended to designate solar radiation, although it might also designate the light produced by radiating elements, such as lamps and the like. Solar radiation comes from the outdoor environment and is directed toward the indoor environment. Of course, radiation may be also oppositely directed.

In any case, the term "indoor environment" is used herein to designate an environment in which light shading is desired.

Reference will be made herein to the retroreflective properties of certain elements. The term "retroreflective properties" is intended to designate the ability of an element to return or reflect the radiation toward its source, whatever the angle of incidence of the radiation on the element, within certain limits. This angle of incidence falls within a range from 0° to 180°.

Referring to the accompanying figures, the insulated glazing system 1 comprises at least two glass panes and a spacer element, with the at least two glass panes and the spacer element defining a closed volume.

Namely, in the particular illustrated embodiment, the insulated glazing unit 2 comprises a first glass pane and a second glass pane as well as a spacer element (not shown), to thereby define a substantially hermetically sealed volume which is designed to contain:

a light ray shielding device 3 (e.g., a venetian blind); and air or more preferably noble gases such as argon or krypton, which are characterized by lower heat transfer coefficients as compared with air, for significant enhancement of heat management.

It shall be noted that, in other embodiments, the insulated glazing unit 2 may also comprise three or more glass panes.

The insulated glazing unit 2 is designed to be mounted to a frame which is in turn adapted to be placed in a wall of a building.

As used hereinafter, the term "within the insulated glazing unit" relates to the insulated glazing unit 2 as installed, therefore the term "within the insulated glazing unit" shall be intended as the closed volume that is defined by the two glass panes at the sides, and by the spacer element above and below along the vertical sides, with the terms "above" and "below" relating to the lying plane, i.e. the plane in which the insulated glazing unit 2 is installed.

The spacer element, as is known per se, comprises a first surface designed for coupling with the first glass pane using an appropriate adhesive, and a second surface designed for coupling with the second glass pane using the appropriate adhesive. The first surface and the second surface are parallel and preferably opposite to each other. The spacer element is preferably made into a single frame-like closed element using a low heat conductivity material, such as natural or synthetic rubber.

The spacer element is sealed to the two panes by means of at least one sealing arrangement. This will provide a low-permeability sealing perimeter, which will reduce the emission of gas to the atmosphere at the peripheral frame, i.e. where the spacer is mounted.

A light ray shielding device 3 is placed within such volume, to define a plurality of transparent areas configured to allow the passage of incident light rays with a given angle of incidence, and a plurality of non-transparent areas, configured to block the passage of light rays.

This light ray shielding device 3 is arranged, in an operating configuration, such that it will at least partially cover the surface of the two panes or, in another operating configuration, such that it will cover a limited portion of the surface of the two panes.

Advantageously, the non-transparent areas define a first surface and a second surface, opposite to the first surface. For example, the first surface is the surface that faces outside the environment delimited by the insulated glazing unit, whereas the second surface is the surface that faces inside the environment delimited by the insulated glazing unit, or vice versa.

The sizes of the transparent areas and the non-transparent areas or the ratio of the transparent areas to the non-transparent areas (or vice versa) are assessed from time to time according to the particular application of the insulated glazing unit and/or the particular light ray shielding device in use, as more clearly explained hereinbelow.

The transparent areas and/or the non-transparent areas may have a circular, quadrangular, rhomboidal, rectangular, ellipsoidal shape or an irregular shape.

The insulated glazing system 1 comprises support means 32 mechanically connected to the spacer element and operably associated with the light ray shielding device in supporting relationship thereto, within the volume defined by the at least two glass panes.

It shall be noted that the support means 32 are also configured to move the light ray shielding device 3, i.e. are configured to provide axial and/or orientation movement to the light ray shielding device 3.

In one aspect, the light ray shielding device 3 comprises a layer 333 having retroreflective properties, said layer 333 at least partially covering one or both of the first and second surfaces of at least one of the areas of the plurality of non-transparent areas of the light ray shielding device 3.

In other words, the surface that faces the outdoor environment and/or the indoor environment of the non-transparent area/s comprises a layer 333 having retroreflective properties, which allows certain light rays to be reflected toward the source and other rays to pass unreflected through the transparent area/s of the light ray shielding device 3 to illuminate the indoor environment, without heating or anyway without excessively heating the volume enclosed by the insulated glazing unit 2.

In a preferred embodiment, the layer 333 having retroreflective properties comprises a paint 334 and a plurality of microspheres 335. Particularly, the microspheres 335 are formed from a material that is transparent to light radiation, such as glass.

Preferably, once the paint 334 has been placed on the first and/or second surfaces of one, some or all of the non-transparent areas, it defines a free surface, with such microspheres 335 emerging with at least a portion thereof from the free surface of the paint 334.

In one aspect, the microspheres 335 are at least partially coated with aluminum.

In one embodiment, the microspheres 335 have a diameter ranging from 0.01 mm to 0.1 mm and the paint 334 has a thickness ranging from 0.01 mm to 0.03 mm.

In an alternative embodiment, the layer 333 having retroreflective properties comprises a paint 334 and a plurality of cube edges.

In an alternative embodiment, the layer 333 having retroreflective properties comprises a reflective adhesive film. For instance, the reflective adhesive film is available from 3M®.

It will be appreciated that a preferred embodiment of the light ray shielding device 3 will be described hereinbelow, in the form of a Venetian blind.

Figure 4:
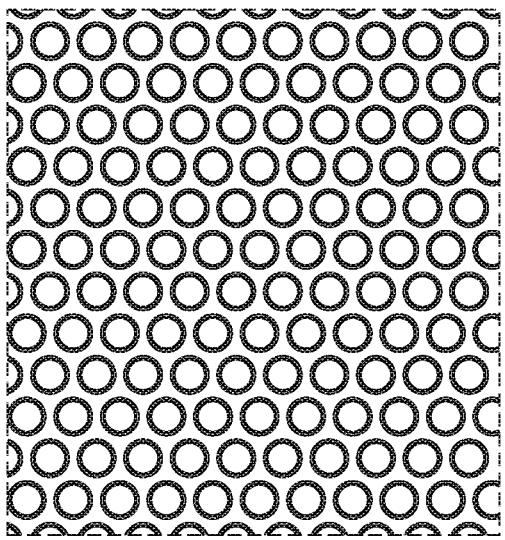
FIGS. 4 and 5 show alternative embodiments of a light ray shielding device suitable for use in the insulated glazing system, which have no retroreflective layer.
Figure 5:
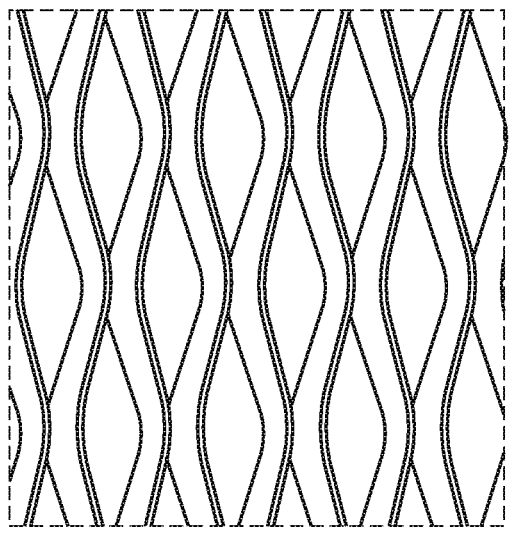

Nevertheless, also referring to FIGS. 4 and 5, the light ray shielding device 3 may be also provided in the form of a perforated plate (see FIG. 4) or a stretched plate (see FIG. 5) or possibly with a textile material, and provide substantially the same advantages and the same technical effects.

With the above in mind and referring now to FIG. 1, the light ray shielding device 3 is implemented as a Venetian blind comprising a plurality of slats 33.

Each slat of such plurality of slats 33 provides a non-transparent area defining the first surface and the second surface, with the layer 333 at least partially covering one of the first surface and the second surface of at least one of such plurality of said slats 33.

In the case of the Venetian blind, the support means 32 comprise retaining means 31 which consist of at least two cords designed for moving the slats, and actuated by control mechanisms 1A.

Nevertheless, it shall be noted that, in alternative embodiments, not shown in the annexed figures, the Venetian blind may be of stationary type and have no slat control mechanism and/or may have aluminum profiles instead of the cords (or the ladders).

The support means 32 comprise a box and all those mechanical, electric and/or electronic elements that can be controlled by the control mechanisms 1A and are configured for moving the blind, with characteristics that are known per se and will not be further described.

Without prejudice to the general scope of the invention, the blind integrated in the insulated glazing unit will be described below with reference to an embodiment including at least two cords and ladders, for axial and orientation movement of the slats.

The slats 33 are preferably substantially rectangular elements, with a first side of the rectangle having a linear extent that is greater than that of the other side.

The slats 33 are preferably curved about an axis parallel to such first side.

The slats 33 are made of rigid and light-weight material, e.g. a metal material such as aluminum.

These materials that form the slats 33 are not transparent to incident light and form the aforementioned non-transparent areas of the light ray shielding device.

Figure 2A:
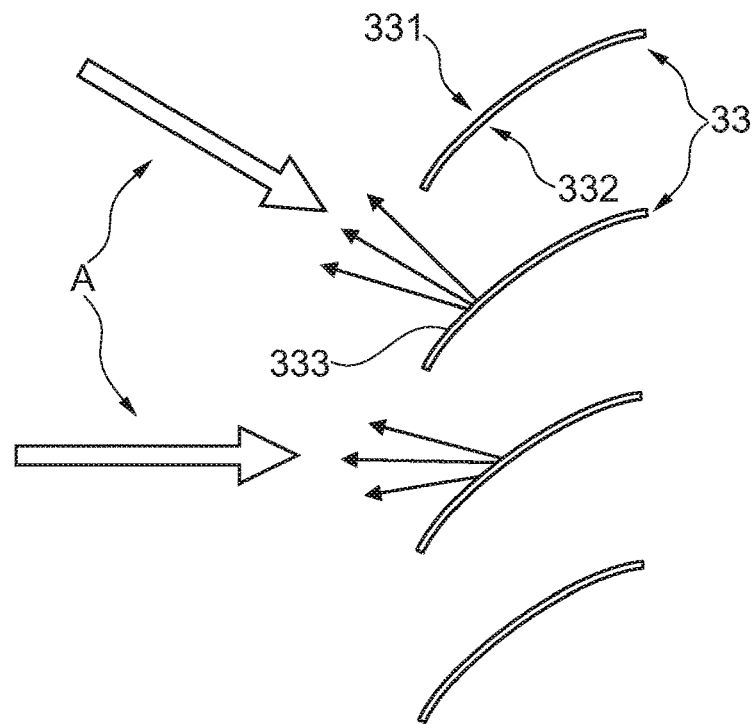
FIG. 2a shows a path for incident light on the slats of a Venetian blind according to the present invention.

Referring to FIG. 2a, each slat 33 defines or forms the first surface 331 and the second surface 332.

In one aspect, the layer 333 having retroreflective properties at least partially covers one of the first surface 331 and the second surface 332 of the slat 33.

Advantageously, the radiation, indicated by the arrow A of FIG. 2a, incident on the slats 33 with retroreflective properties, is reflected toward its source direction, and comes out of the insulated glazing unit 2 back to the source from which it was radiated (e.g. the sun).

It shall be noted that, due to the retroreflective properties, the reflection is almost independent of the angle of incidence of the radiation relative to the insulated glazing unit.

Figure 2B:
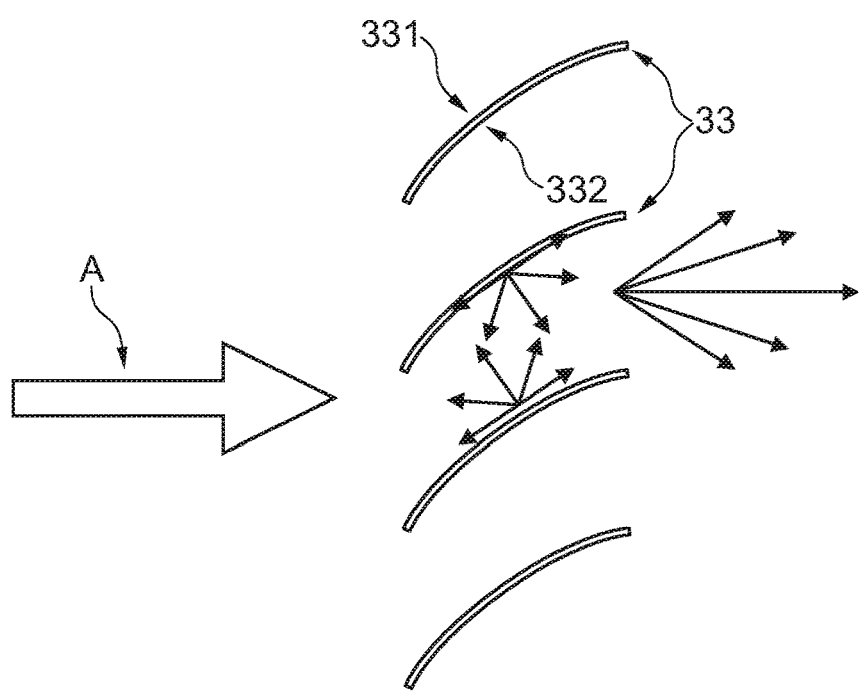
FIG. 2b shows a path for incident light on the slats of a Venetian blind according to the prior art.

Conversely, prior art slats 33, as shown in FIG. 2b, reflect light in various directions. Therefore, part of the light is reflected among the slats 33 and does not come out of the insulated glazing unit 2. Also, part of the light, once it has been reflected, enters the indoor environment.

Therefore, advantageously a light ray shielding device 3 (e.g., venetian blind) with slats 33 according to the present disclosure reduces heating of the insulated glazing unit 2 and dazzling of the observers in the indoor environment.

In one embodiment, each slat 33 comprises a layer 333 with retroreflective properties, which entirely coats the first surface 331, to thereby reduce the heating effect with light incident on the light ray shielding device 3 (e.g., venetian blind).

In one embodiment, each slat 33 comprises a layer 333 with retroreflective properties, which entirely coats the second surface 332, to thereby reduce the dazzling effect on observers in the indoor environment.

Also, each slat 33 may be covered with layers having retroreflective properties in both the first surface 331 and the second surface 332, to maximize both effects.

Figure 3:
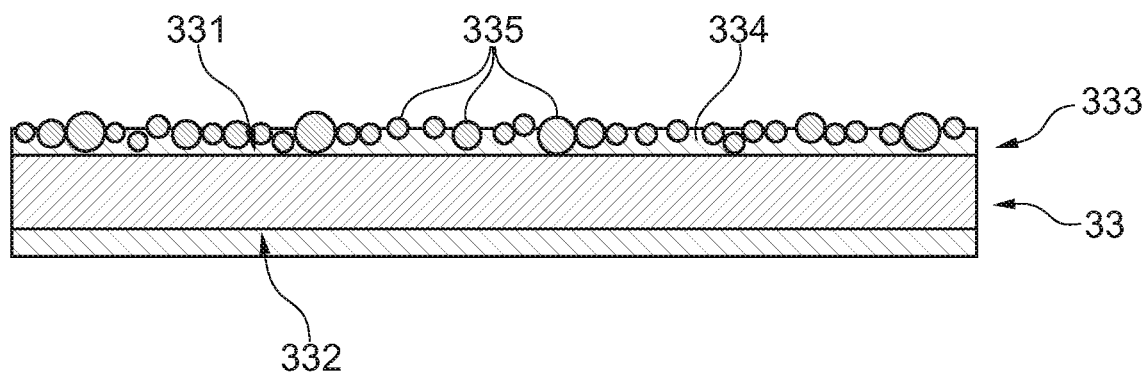
FIG. 3 is a sectional view of a slat of a Venetian blind of FIG. 2a, comprising a layer having retroreflective properties according to the present invention.

In a preferred embodiment, as shown in FIG. 3, the layer 333 with retroreflective properties comprises a paint 334 which incorporates microspheres 335.

In FIG. 3, the layer 333 with retroreflective properties only covers the first surface 331 of the slats 33.

The paint 334 has the purpose of fixing or retaining the microspheres 335 against the slats 33, whereas the microspheres 335 have a retroreflective function proper.

Here, the application of the layer 333 with retroreflective properties to the slats 33 includes the steps of applying the paint 334 to the slats 33, and applying the microspheres 335 to the paint 334 when the latter is still wet.

Advantageously, the radiation incident on a single microsphere 335 is substantially returned toward its source, due to the geometry of the microspheres 335 and particularly due to the refraction index of the transparent material that forms the microspheres.

Advantageously, the microspheres 335 are arranged to densely cover the surface of the slats 33 with the gap between microspheres being smaller than the size of the microsphere itself.

Thus, a considerable amount of radiation incident on the layer 333 is actually incident on the microspheres 335 and not directly on the slats 33, and as a result the layer 333 effectively performs its retroreflective function.

As is shown in FIG. 3, the microspheres 335 partially emerge from the free surface of the paint 334.

As used herein, the term "free surface" is intended as the outer layer, i.e. the layer that does not contact the first surface 331 or second surface 332 of the slat 33.

Conversely, if the microspheres 335 are entirely immersed in the paint 334, then the layer might exhibit retroreflective properties, but to a lesser extent. This is because the light incident on the paint 334 is deflected before impinging upon the microspheres 335, and this reduces the retroreflective effect of the microspheres 335.

These microspheres are preferably formed from a transparent material, such as glass.

Therefore, the microspheres 335 are provided in the form of glass beads, whose diameter ranges from 0.1 mm to 3 mm. In a preferred embodiment, the microspheres 335 have a diameter ranging from 0.01 mm to 0.1 mm.

In one layer 333 with retroreflective properties, microspheres 335 with different diameters may be provided.

The paint 334 preferably has a thickness that ranges from 0.01 mm to 0.03 mm.

Similar dimensions for the microspheres 335 and the paint 334 are compatible with slats 33 having a thickness, for instance, of 0.2 mm.

Advantageously, with the aforementioned dimensions, the microspheres 335 may adhere to the slats 33 and at the same the microspheres 335 may emerge from the free surface of the paint 334.

Nevertheless, different dimensions may be also used, to optimize such properties.

In one embodiment, the microspheres 335 are coated with aluminum.

Advantageously, the aluminum coating imparts a dark gray color to the microspheres 335, to further attenuate the dazzling feeling, without affecting retroreflective properties.

Therefore, the aluminum-coated microspheres 335 are particularly suitable to cover the second surface 332 of the slats 33, i.e. the surface that causes dazzling in observers in the indoor environment.

Those skilled in the art will obviously appreciate that a number of changes and variants may be made to the above described insulated glazing system 1 and light ray shielding device 3, to fulfill particular requirements, without departure from the scope of the invention, as defined in the following claims.

The invention claimed is:

1. An insulating glazing system, comprising:
at least two glass panes and a spacer element, wherein the at least two glass panes and the spacer element define a closed volume;
light ray shielding device, defining:
a plurality of transparent areas allowing passage of incident light rays with a given angle of incidence, whereas light rays having other angles of incidence are unable to pass through the plurality of transparent areas; and
a plurality of non-transparent areas configured to block the passage of the incident light rays, the plurality of non-transparent areas defining a first surface and a second surface, opposite to the first surface; and
a support means connected to the spacer element and operably associated with the light ray shielding device in supporting relationship thereto;
wherein the light ray shielding device is within the closed volume,
wherein the light ray shielding device comprises a layer having retroreflective properties,
wherein the layer having the retroreflective properties at least partially covers one or both of the first and second surfaces of at least one of the areas of the plurality of non-transparent areas of the light ray shielding device,
wherein the layer having the retroreflective properties comprises a paint and a plurality of microspheres, and
wherein each microsphere of the plurality of microspheres is configured to return the incident light rays.

2. The insulated glazing system of claim 1, wherein the microspheres comprise a transparent material.

3. The insulated glazing system of claim 1, wherein the paint defines a free surface, and
wherein the microspheres have at least a portion thereof emerging from the free surface of the paint.

4. The insulated glazing system of claim 1, wherein the microspheres are at least partially coated with aluminum.

5. The insulated glazing system of claim 1, wherein the microspheres have a diameter greater than or equal to 0.01 millimeters (mm) and less than or equal to 3 mm.

6. The insulated glazing system of claim 1, wherein the paint has a thickness greater than or equal to 0.01 millimeters (mm) and less than or equal to 0.03 mm.

7. The insulating glazing system of claim 1, wherein the layer having the retroreflective properties comprises a reflective adhesive film.

8. The insulated glazing system of claim 1, wherein the light ray shielding device comprises a venetian blind having a plurality of slats each defining a non-transparent area of the plurality of non-transparent areas,
wherein each of the plurality of slats defines the first surface and the second surface, and
wherein the layer having the retroreflective properties at least partially covers one of the first surface and the second surface of at least one of the plurality of slats.

9. The insulated glazing system of claim 1, wherein the light ray shielding device comprises a fabric, a perforated plate, or a stretched plate.

10. The insulated glazing system of claim 1, wherein the microspheres are arranged to cover one or both of the first and second surfaces of at least one of the plurality of non-transparent areas of the light ray shielding device, while leaving a gap between the microspheres which is smaller than a dimension of the microspheres.

* * * * *